United States Patent [19]
Erb et al.

[11] Patent Number: 5,433,797
[45] Date of Patent: Jul. 18, 1995

[54] NANOCRYSTALLINE METALS

[75] Inventors: Uwe Erb, Glenburnie; Abdelmounam M. El-Sherik, Kingston; Cedric K. S. Cheung, Kingston; Martin J. Aus, Kingston, all of Canada

[73] Assignee: Queen's University, Kingston, Canada

[21] Appl. No.: 182,474

[22] Filed: Jan. 18, 1994

Related U.S. Application Data

[63] Continuation-in-part of Ser. No. 983,205, Nov. 30, 1992, Pat. No. 5,352,266.

[30] Foreign Application Priority Data

Nov. 26, 1993 [WO] WIPO .............. PCT/CA93/00492

[51] Int. Cl.⁶ .................... H01F 1/147; C25D 3/00
[52] U.S. Cl. ........................... 148/304; 148/403; 205/104; 205/238; 205/243; 205/245; 205/246; 205/255; 205/270; 205/291; 205/269; 205/283; 205/102
[58] Field of Search .............. 205/104, 102, 269, 283, 205/291, 270, 238, 243, 244, 245, 246, 255; 75/300; 148/304, 403

[56] References Cited
U.S. PATENT DOCUMENTS 4,461,680 7/1984 Lashmore .................... 204/41
5,149,381 9/1992 Grewe et al. ................ 148/403

OTHER PUBLICATIONS

Grimmet, D. L. University of California Ph.D. Thesis, (1990).
Erb, et al. Nanostructured Mats vol. 2 383-390 (1993).

Primary Examiner—Kathryn Gorgos
Attorney, Agent, or Firm—Richard J. Hicks

[57] ABSTRACT

A process for producing nanocrystalline materials, and in particular nanocrystalline nickel having an average grain size of less than about 11 nanometers and ternary and quaternary nickel-iron alloys, such as NiFeCr and NiFeCrMn alloys, having a grain size less than about 100 nm is described. The nanocrystalline nickel is electrodeposited onto the cathode in an aqueous acidic electrolytic cell by application of a pulsed D.C. current. The ternary and quaternary Nickel-Iron alloys and other binary, ternary and quaternary alloys may be produced by D.C. electroplating or by pulsed D.C. electroplating. The cell electrolyte also contains a stress reliever, such as saccharin, which helps to control the grain size. The novel products of the invention find utility as wear resistant coatings, hydrogen storage materials, magnetic materials and as catalysts for hydrogen evolution.

9 Claims, 7 Drawing Sheets

NANOCRYSTALLINE METALS

CROSS REFERENCE TO RELATED APPLICATION

This application is a continuation-in-part of earlier filed U.S. patent application Ser. No. 07/983,205 filed 30 Nov. 1992 in the names of Uwe Erb & Abdelmounam M. El-Sherik and now U.S. Pat. No. 5,352,266, issued 4 Oct. 1994.

FIELD OF INVENTION

This invention relates to nanocrystalline metals and alloys thereof and methods of production thereof, and more particularly to the production of nanocrystalline nickel having a grain size of less than 11 nanometers and selected pure metals, binary, ternary and quaternary alloys thereof having a grain size of less than about 100 nanometers.

BACKGROUND OF INVENTION

Nanocrystalline materials are a new class of disordered solids which have a large volume fraction (up to 50% or more of the atoms) of defect cores and strained crystal lattice regions. The physical reason for the reduced density and the non-lattice spacing between the atoms in the boundary cores is the misfit between the crystal lattice of different orientation along common interfaces. The nanocrystalline system preserves in the crystals a structure of low energy at the expense of the boundary regions which are regions at which all of the misfit is concentrated so that a structure far away from equilibrium is formed (Gleiter, Nanocrystalline Materials, Prog. in Matls Science, Vol 33, pp 223-315, 1989). A structure of similar heterogeneity is not formed in thermally induced disordered solids such as glasses. Nanocrystalline materials typically have a high density ($10^{19}$ per cm$^3$) Of grain interface boundaries. In order to achieve such a high density, a crystal of less than about 100 nm diameter is required. Over the past few years great efforts to make smaller and smaller nanocrystals, down to about 10 nm have been made. It would appear, however, that the properties of even smaller nanocrystals (less than 10 nm) offer significant advantages over larger nanocrystals, particularly in the area of hardness, magnetic behaviour hydrogen storage, and wear resistance.

Nanocrystalline materials, which are also known as ultrafine grained materials, nanophase materials or nanometer-sized crystalline materials, can be prepared in several ways such as by sputtering, laser ablation, inert gas condensation, oven evaporation, spray conversion pyrolysis, flame hydrolysis, high speed deposition, high energy milling, sol gel deposition, and electrodeposition. Each of these methods has its special advantages and disadvantages and not all methods are suitable for all types of nanocrystalline materials. It is becoming apparent, however, that electrodeposition is the method of choice for many materials. The major advantages of electrodeposition include (a) the large number of pure metals, alloys and composites which can be electroplated with grain sizes in the nanocrystalline range, (b) the low initial capital investment necessary and (c) the large body of knowledge that already exists in the areas of electroplating, electrowinning and electroforming.

Using electrodepositing techniques, nanocrystalline electrodeposits of nickel and other metals and alloys have been produced over the years with ever smaller diameters down to the 10-20 nm range. Heretofore, it has not been possible to get sizes below about 10 nm diameter. Small crystal sizes increase the proportions of grain boundaries and triple junctions in the material. It is known that room temperature hardness increases with decreasing grain size in accordance with the known Hall-Petch phenomenon. However, it has now been determined that as the number of triple junctions in the material increases, at about 30 nm down, there is a deviation from normal Hall-Petch behaviour and hardness does not continue to increase as the grain size falls below a critical value. Indeed, it has now been shown that in pure nickel nanocrystalline materials the hardness reaches a peak in the 8-10 nm range. Other materials even show a decrease in hardness as the grain size decreases below about 10 nm.

Binary nickel-iron nanocrystalline alloys have been described in a University of California Ph.D. thesis by D. L. Grimmett in 1990. Nickel-Phosphorus and Cobalt-Tungsten nanocrystalline materials are also known (C. McMahon et al Microstr. Sci. 17, 447 (1989) and Erb et al Nanostructured Mats Vol 2 383-390 (1993)).

Nanocrystalline materials have improved magnetic properties compared to amorphous and conventional polycrystalline materials. Of particular importance is the saturation magnetization, which should be as high as possible regardless of grain size. However, previous studies on gas-condensed nanocrystalline nickel (Gong et al, J. Appl. Phys 69, 5119, (1991)) reported decreasing saturation magnetization with decreasing grain size. It would appear, however, that this phenomenon is associated with the method of production as electroplated nanocrystalline nickel in accordance with the present invention shows little change in saturation magnetization.

OBJECT OF INVENTION

An object of the present invention is to provide a novel pulsed electrodeposition process for making nanocrystalline materials of less than 100 nm in diameter.

Another object is to provide nanocrystalline metals, binary, ternary and quaternary alloys having a grain size of less than 100 nm and some of which have enhanced magnetic properties.

Yet another object is to provide an apparatus for producing very fine nanocrystalline materials by pulsed electrodeposition.

BRIEF STATEMENT OF INVENTION

By one aspect of this invention, there is provided a process for electrodepositing a selected metallic material in nanocrystalline form on a substrate comprising:
 (a) providing an electrolytic cell having an anode and cathode;
 (b) introducing an aqueous, electrolyte containing ions of said selected metallic material into said electrolyte cell;
 (c) maintaining said electrolyte at a temperature in the range between about 15° and about 75° C.; and
 (d) passing a DC current, having a peak current density in the range between about 0.1 and about 3.0 A/cm$^2$, at pulsed intervals during which said current passes for a time period in the range of about 0.1 to about 5 milliseconds and does not pass for a time period in the range of about 1 to about 500 milliseconds between said anode and said cathode so as to deposit said selected metallic material in nanocrystalline form on said cathode.

By another aspect of the invention, there is provided a nanocrystalline metallic material having a grain size of less than 100 nm and selected from the group consisting of (a) a pure metal selected from the group consisting of Co, Cr, Cu and Fe, and (b) alloys containing at least two elements selected from Ni, Fe, Co, Zn, Ti, S, Mg, W, Cr, Cu, Mo, Mn, V, Si, P, C, and S, with the proviso that, in a binary alloy when a first said element is nickel, the second element is not iron or phosphorus, and in a binary alloy in which the first element is Co, the second element is not W.

By yet another aspect of this invention, there is provided nanocrystalline ternary and quaternary Nickel-Iron alloys of the Ni Fe $X_1$ $X_2$ type, where $X_1$ and $X_2$ are zero or selected from Cr, Cu, Mn, P, S, Si, V, Co, Ti, Mo, P, and C and having a grain size below about 100 nm.

DETAILED DESCRIPTION OF PREFERRED EMBODIMENTS

As noted hereinabove, pulsed direct current electrodeposition has been found to produce superior nanocrystalline materials, and particularly nickel, having a grain size of less than about 11 nm. Ternary or quaternary nickel-iron alloys having a grain size of less than about 100 nm can also be produced by pulsed D.C. electrodeposition or by D.C. electroplating as well as nanocrystalline Co, Cr, Cu and Fe.

Figure 1:
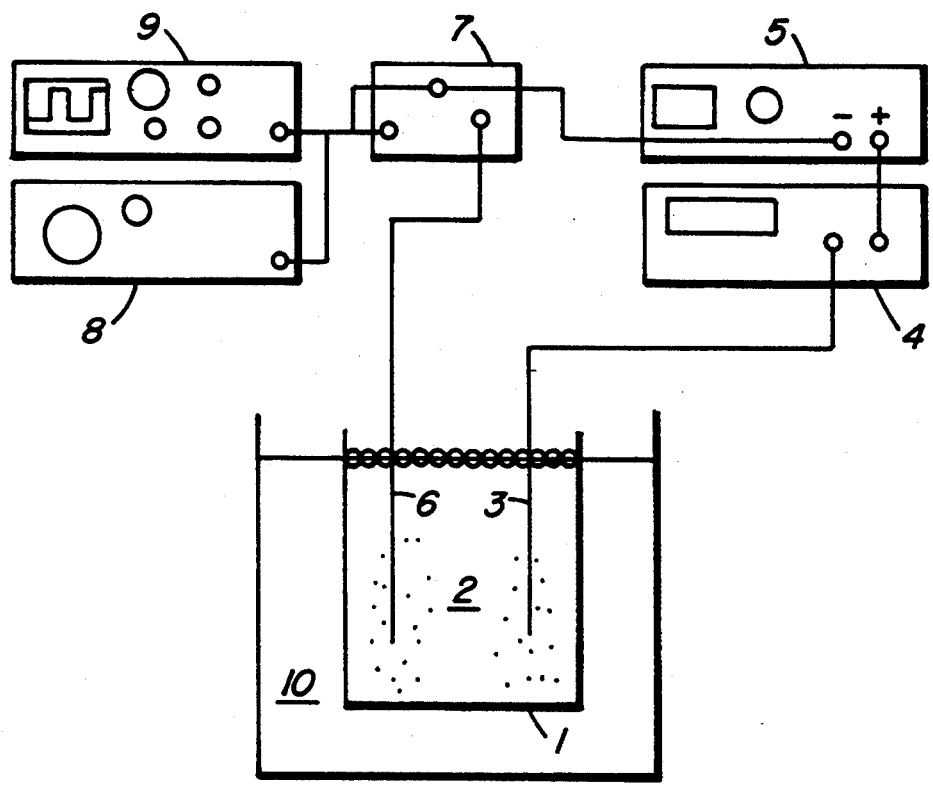
FIG. 1 is a diagrammatic sketch of one embodiment of an apparatus for use in the process of the present invention.

The invention will now be described with particular reference to the production of nanocrystalline nickel and FIG. 1 is a sketch showing a laboratory apparatus for carrying the present invention into practice. A plating cell 1, generally of glass or thermoplastic construction, contains an electrolyte 2 comprising an aqueous acid solution of nickel sulfate, nickel chloride, boric acid and selected grain Size inhibitors, grain nucleators and stress relievers, to be described in more detail hereinbelow. An anode 3 is connected to an ammeter 4 (Beckman, Industrial 310) in series connection to a conventional DC Power Source 5 (5 amp, 75 volt max output). The anode may be any dimensionally stable anode (DSA) such as platinum or graphite, or a reactive anode, depending on the material desired to be deposited. Preferably, in the case of nickel deposition, the anode is an electrolytic nickel anode. A cathode 6 is connected to the power source 5 via a transistored switch 7. Cathode 6 may be fabricated from a wide variety of metals such as steel, brass, copper and or nickel, or non-metal such as graphite. Preferably, cathode 6 is fabricated from titanium to facilitate stripping of the nickel deposited thereon. Switch 7 is controlled by a wave generator 8 (WaveTEK, Model 164) and the wave form is monitored on an oscilloscope 9 (Hitachi V212).

The temperature of the electrolyte 2 is maintained in the range between about 55° and 75° C. by means of a constant temperature bath 10 (Blue M Electric Co.). A preferred temperature range is about 60°–70° C. and most preferably about 65° C. The pH is controlled by additions such as $Ni_2CO_3$ powder or 7:1 $H_2SO_4$:HCl as required.

Figure 2:
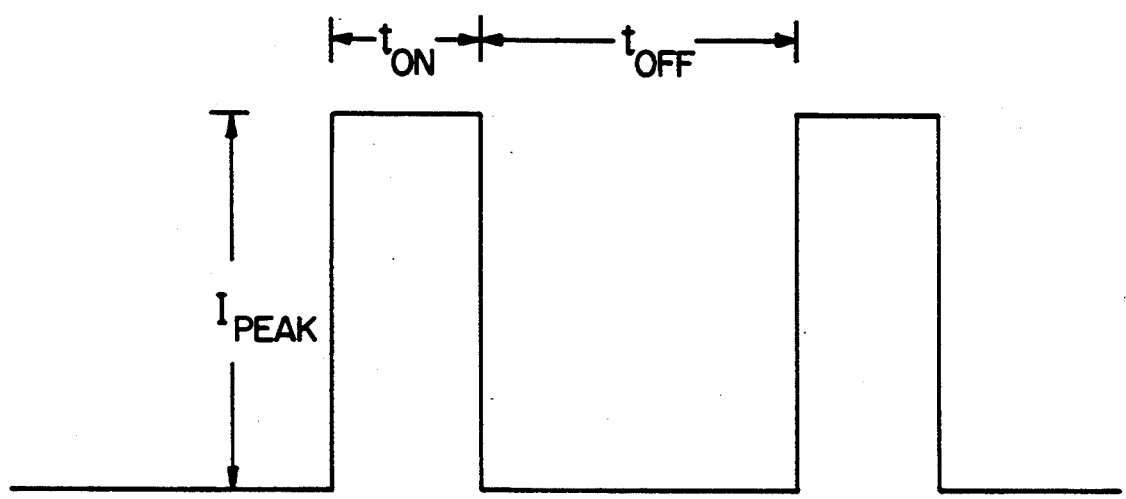
FIG. 2 is a graph illustrating current density versus time during a plating cycle.

The quality of the deposit and the crystalline structure thereof are functions of the peak current density in the cell 1, and the rate of pulsing the current. FIG. 2 illustrates the maximum current density ($I_{peak}$) as a function of time. It will be noted that generally the time off ($t_{off}$) is longer than the time on ($t_{on}$) and that the current density $I_{peak}$ may vary between about 1.0 A/cm$^2$ and about 3.0 A/cm$^2$. The $t_{on}$ may vary between about 1.0 and 5.0 msec., with a preferred range of 1.5–3.0 msec and an optimum value of 2.5 msec. The $t_{off}$ may range from about 30 msec. to 50 msec. with an optimum of 45 msec. It will be appreciated that $I_{peak}$, $t_{on}$ and $t_{off}$ are interrelated and may be varied within the stated ranges. If the $I_{peak}$ is too high, there is a risk that the deposited material will burn and, if too low, the grain size will increase.

In all of the following examples, which are illustrative only and not limiting on the invention, the electrolytic cell described above was employed with an electrolytic nickel anode and a titanium cathode and an aqueous electrolyte (Bath 1) containing:

| | |
|---|---|
| Nickel Sulphate (BDH) | 300 gm/l |
| Nickel Chloride (BDH) | 45 gm/l |
| Boric Acid (BDH) | 45 gm/l in distilled water. |

The pH was adjusted, as noted above, by addition of $Ni_2CO_3$ powder or 7:1 $H_2$ $SO_4$: HCl. The temperature was maintained at 65° C., for a standard plating time of 3 hours. Saccharin is a known stress reliever and grain refining agent and may be added in amounts up to about 10 gm/l. Other stress relievers and grain refining agents which may be added include coumarin sodium lauryl sulfate and thiourea. If the bath temperature rises, it may be desirable to add a grain size inhibitor such as phosphorous acid in relatively small amounts up to about 0.5–1 gm/l.

EXAMPLE 1

Using the apparatus described with reference to FIG. 1 and a basic bath electrolyte composition described above as "Bath 1", 0.5 gm/l saccharin (Aldrich) was added and the pH adjusted to pH 2. The $I_{peak}$ was 1.9 A/cm$^2$ and $t_{on}$ was 2.5 m sec. and $t_{off}$ was 45 m sec. The result was a porosity free nanocrystalline nickel deposit of 0.250–0.300 mm thickness with an average grain size of 35 nm.

EXAMPLE 2

The procedure and operating conditions of Example 1 were repeated except that the saccharin concentration was increased to 2.5 gm/l. The result was a porosity free deposit of 0.220–0.250 mm thickness with an average grain size of 20 nm.

EXAMPLE 3

Example 1 was repeated except that the saccharin concentration was increased to 5 gm/l. The result was a porosity free deposit of 0.200 mm thickness with an average grain size of 11 nm.

EXAMPLE 4

Example 1 was repeated except that the pH was adjusted to pH 4.5 and the saccharin concentration was increased to 10 gm/l. The result was a porosity free deposit of 0.200–0.220 mm thickness with an average grain size of 6 nm.

EXAMPLE 5

The products of Examples 1–3 were subjected to hardness testing using a standard Vickers hardness technique. The results are tabulated in FIG. 3 and illustrate that at the large grain sizes porosity free electroplated nickel nanocrystals obey the well established Hall-Petch relationship, i.e. increasing hardness with decreasing grain size. However, for the very small sizes of the present invention, there is a clear deviation from the Hall-Petch relationship indicating a maximum hardness in the 8–10 nm size range.

EXAMPLE 6

Figure 4:
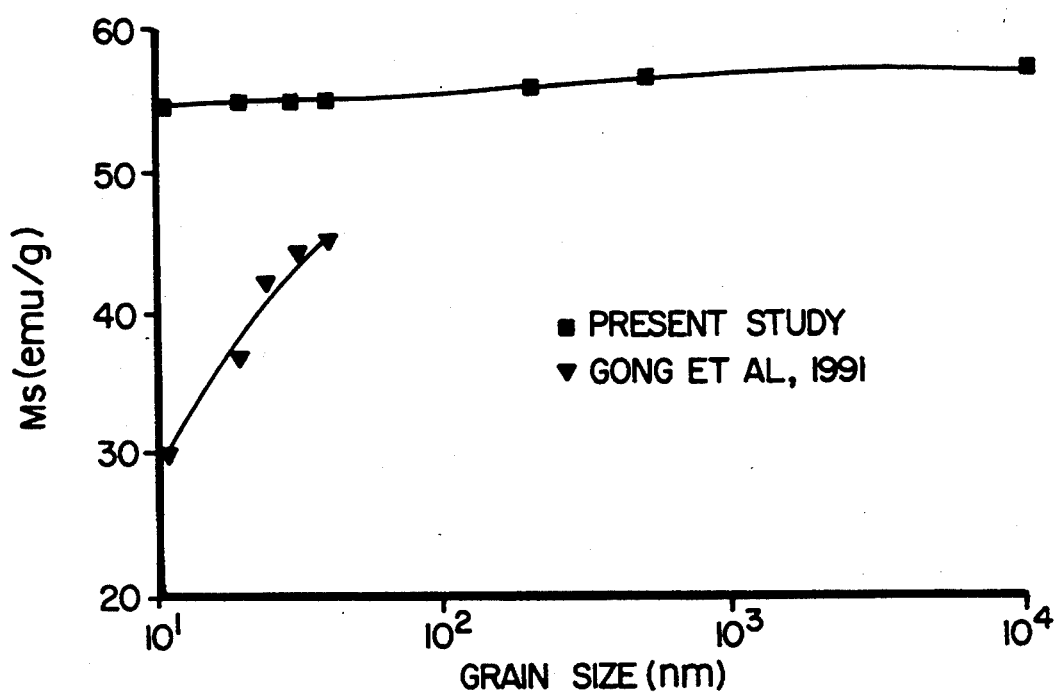
FIG. 4 is a graph of magnetic saturation (emu/g) versus grain size for nanocrystalline nickel produced according to the present invention, and compared to the prior art.

The saturation magnetization of the products of Examples 1–3 was measured using conventional methods. The results are tabulated in FIG. 4 and compared with the saturation magnetization of gas condensed nanocrystalline nickel as reported by Gong et al, supra. It will be noted that while Gong et al report decreasing saturation magnetization with decreasing grain size, the products of the present invention show very little change in saturation magnetization with grain size variation, and even at the smallest grain sizes it is essentially the same as for conventional nickel.

The nanocrystalline materials of this invention, and particularly nanocrystalline nickel can be used to provide hard, wear resistant coatings on many surfaces. They can also be used as hydrogen storage materials, as catalysts for hydrogen evolution and as magnetic materials.

While the invention has been described thus far with reference particularly to nanocrystalline nickel, the principles thereof are equally applicable to nanocrystalline soft magnet materials, which are frequently ternary and quaternary iron-nickel alloys, and more particularly include Permalloy ® (78.5 Ni 17.1 Fe 3.8 Cr. 0.6Mn), Hy Mu ® (80Ni 16 Fe 4Mo) Supermalloy ® (79Ni 15.7 Fe 5Mo 0.3Mn) and Mumetal (76Ni 17Fe 5Cu 2Cr) (Woldman, Engineering Alloys, 4th Ed, 1962). Other ternary and quaternary alloys may contain elements selected from Ni, Fe, Co, Zn, W, Cr, Cu, Mo, Mn, V, Ti, Mg, Si, P, C and S. The soft magnetic materials find utility in many applications but are particularly useful for recording head applications which require high electrical resistivity to improve high frequency permeability and to minimize eddy current losses. These materials also exhibit good wear characteristics. It has also been found that, while useful, pulsed D.C. electroplating is not essential for the production of nanocrystalline (<50nm) nickel-iron alloys such as those described above. Direct-Current electroplating under carefully controlled conditions has been found adequate.

EXAMPLE 7

Production of Ternary Nickel-Iron Chromium Alloys

Figure 5:
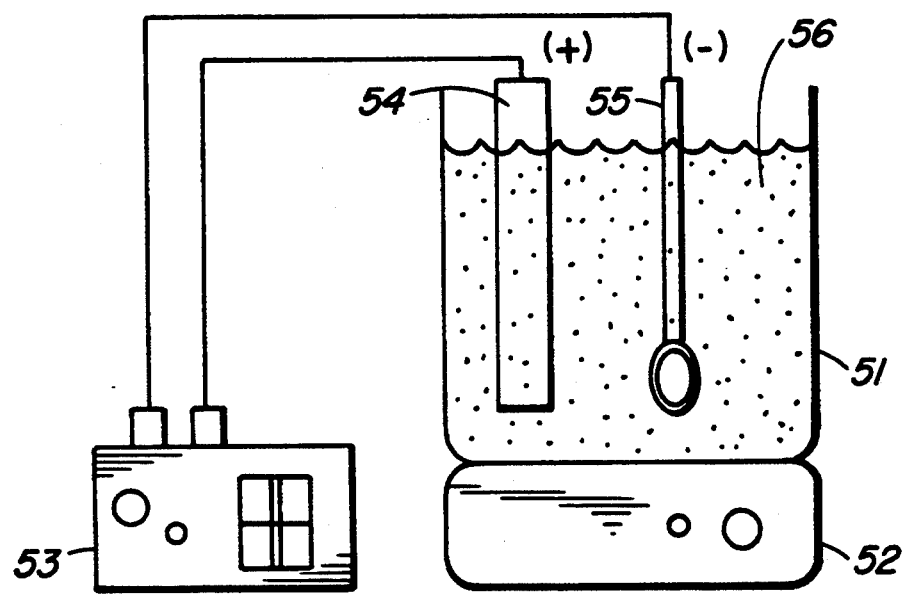
FIG. 5 is a diagramatic sketch of an alternative embodiment of an apparatus for use in the present invention.

A simple laboratory electroplating bath 51 (FIG. 5) was placed on a heating plate 52. An anode 54, preferably but not essentially, graphite and a metallic, preferably copper, cathode 55 were immersed in an electrolyte solution 56 in bath 51 and connected to a controlled DC power supply 53. The electrolyte comprised an aqueous solution containing (in grams/liter of solution):

| | |
|---|---|
| $NiCl_2.6H_2O$ | 50 |
| $CrCl_3.6H_2O$ | 0–100 |
| $FeCl_2.4H_2O$ | 1 |
| NaCl | 0–50 |
| $B(OH)_3$ | 25 |
| $NH_4Cl$ | 25 |

The bath temperature was maintained at a temperature between about 15° C. and about 50° C. (preferably room temperature) and the pH of the bath was maintained in the range 1–3, depending on the chromium content. At high chromium levels, the pH was lowered to prevent formation of chromium hydroxide. The current density was maintained at about 50 mA/sq cm of cathode for periods of time tip to about 2 hours with continuous stirring (0–500 rpm).

In an alternative embodiment using a pulsed D.C. electrolytic cell, periodic pulse reversal was practised resulting in some grain size reduction and improved surface quality. Quality may also be improved using the stress relievers previously described and in addition sodium citrate, "Ethylene diamine tetra acetate", citric acid or sodium fluoride.

Figure 6:
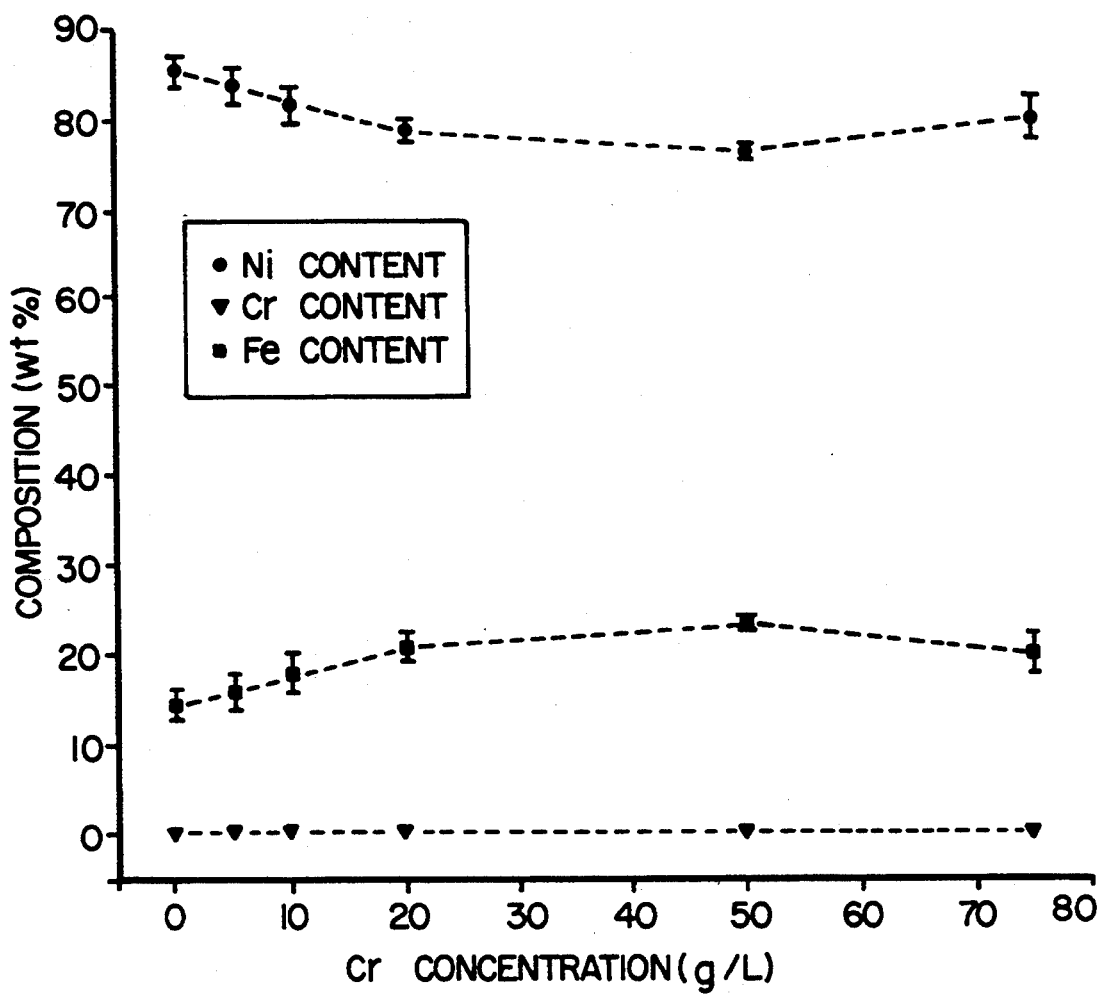
FIG. 6 is a graph illustrating composition of ternary Ni Fe Cr alloys produced in baths containing different concentrations of chromium.

The composition of the alloy deposited on the copper cathode was analyzed by energy dispersive x-ray spectroscopy and the results, in terms of the chromium concentration of the bath were plotted in FIG. 6. It will be noted that the chromium content of the alloy is substantially constant at about 1% but the nickel content tends to fall from a maximtim of about 86% at 0 g/l Cr in the bath to a minimum of about 78% at a concentration of 50 g/l Cr in the bath. Scanning electron microscopy indicated that the grain size of the alloy product was less than 100 nanometers while x-ray diffraction studies indicated a grain size of about 10–15 nanometers with some grain sizes up to about 37 nm.

The electrical, mechanical and magnetic properties of the pure nanocrystalline nickel products of Examples 3 and 4 have been studied in some detail, and it has been determined, somewhat surprisingly in view of previously published results (Gong et al J. Appl. Phys. 69, 5119 (1991)) that saturation magnetization (Ms) of nanocrystalline nickel produced by the process of examples 2, 3 and 4 is essentially independent of grain size. This is, however, consistent with recent calculations (Szpunar et al, Condensed Matter Physics, in press) that show that the magnetic moment of atoms located in special high angle grain boundaries is only insignificantly reduced. Even in an amorphous structure the reduction in Ms is less than 20% and for 10 nm grain sizes with an intercrystalline volume fraction of 27%, the overall reduction in Ms is less than 5%.

Coercivity (Hc) of 50 nm nanocrystalline nickel is about 2.0 kA/m which is about 50% lower than that of conventional polycrystalline (100 nm plus) material (3.0 kA/m). Further reduction in grain size restilts in an increase in coercivity back to the level of the polycrystalline material, which is believed due to the transition from multidomain to single domain grains.

Figure 7:
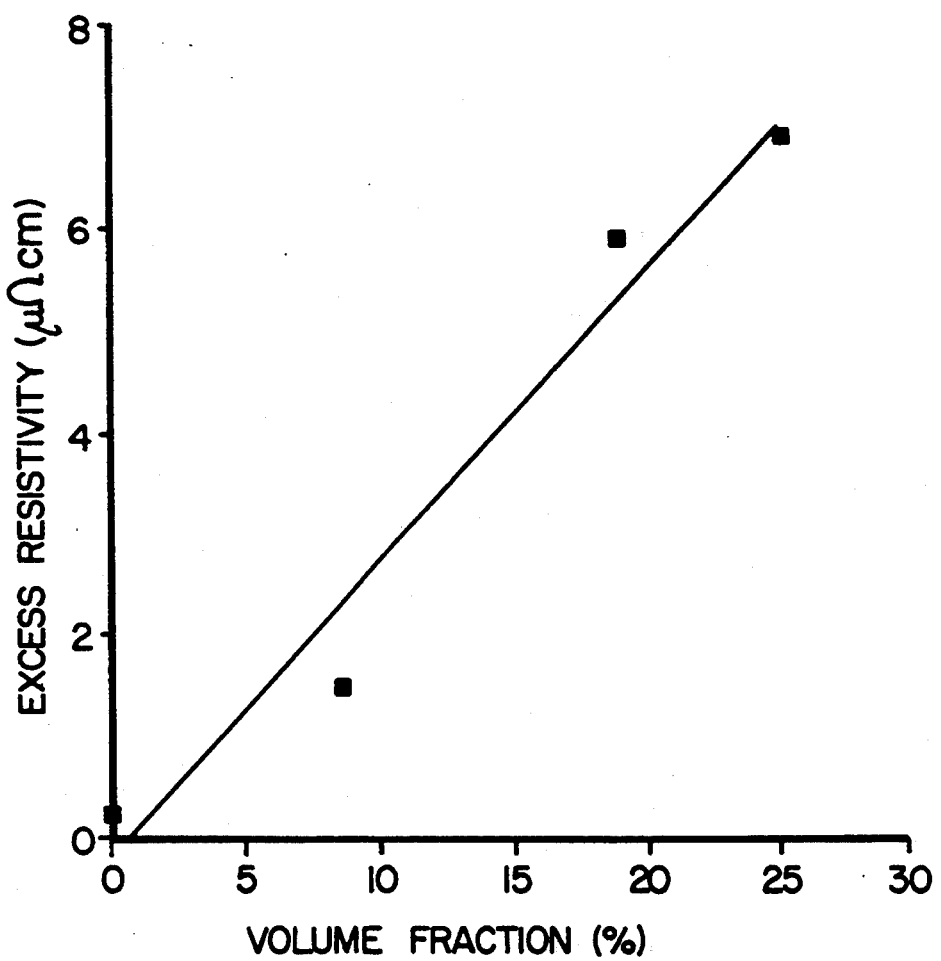
FIG. 7 is a graph illustrating resistivity of nanocrystalline nickel as a function of grain size.

FIG. 7 shows that the room temperature electrical resistivity of the material with a grain size of 11 nm is increased by a factor of three over the resistivity value observed for conventional polycrystalline material. At lower temperatures, this factor increases to approximately five times. This behaviour can be understood in terms of electron scattering at the grain boundaries and triple junctions in the material which should result in an increase in resistivity with increasing intercrystalline volume fraction. This is demonstrated in FIG. 8 which shows the excess resistivity as a function of the intercrystalline volume fraction for the grain sizes shown in FIG. 7. The excess resistivity is defined here as the total resistivity minus the resistivity of conventional polycrystalline nickel for which the intercrystalline volume fraction is negligible. The intercrystalline volume fractions in FIG. 8 were derived for a grain boundary thickness of 1 nm.

Figure 3:
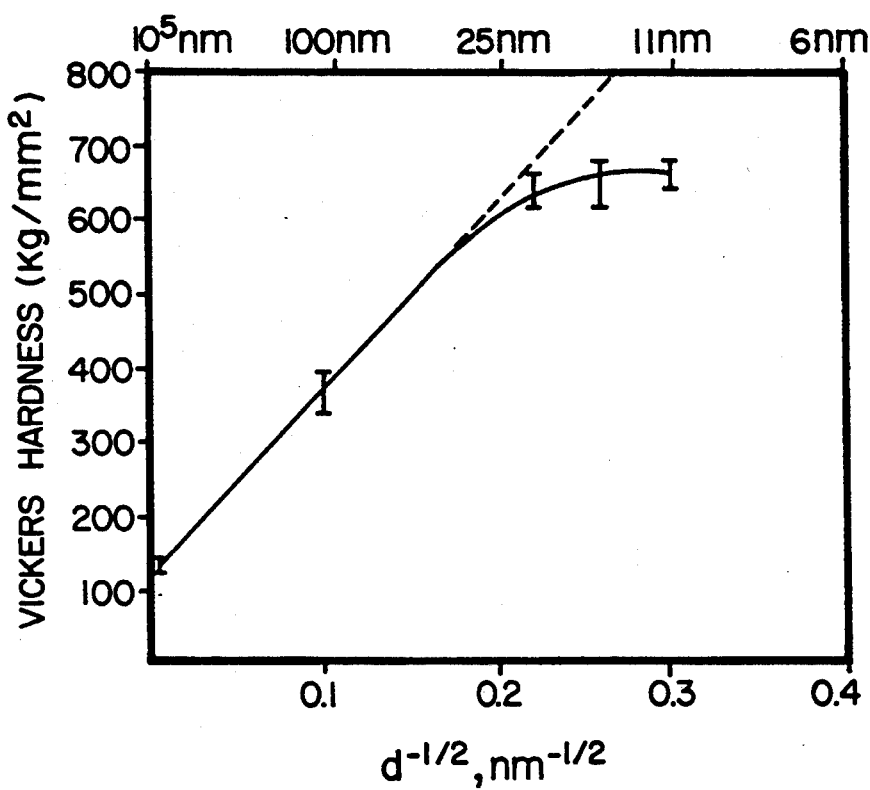
FIG. 3 is a graph of hardness (VHN) versus grain size for nanocrystalline nickel (Hall Perch plot)

Reduced grain size usually results in increased hardness as a result of Hall-Petch strengthening. The Hall-Perch graph for electrodeposited Ni is shown in FIG. 3. Although there is deviation from linearity for grain sizes less than 30 nm, the important finding is that the hardness of the material is increased by a factor of 5 when reducing the grain size from 100 $\mu$m to 10 nm.

Using pin-on-disk wear testing under dry conditions, an enhancement of the wear resistance by a factor of four was observed for the same materials.

Figure 9:
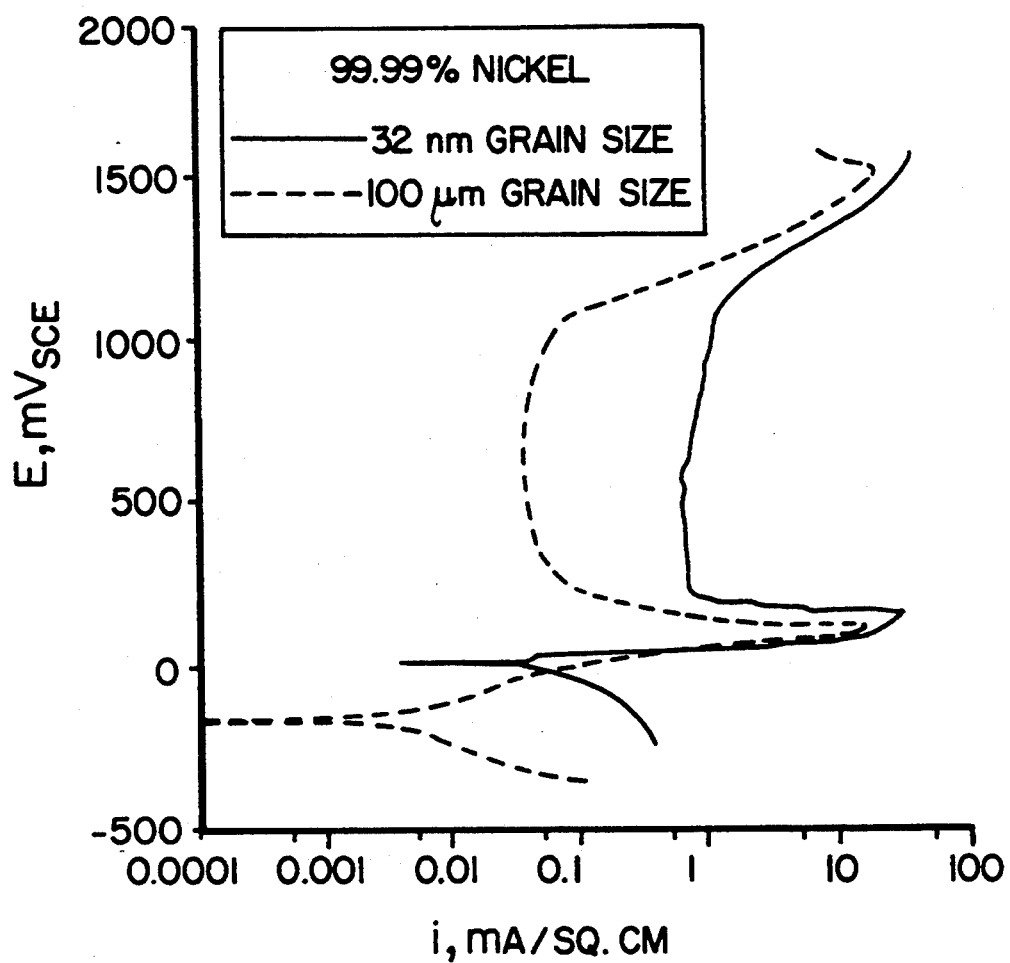
FIG. 9 shows polarization curves for nano- and polycrystalline nickel.

The corrosion behaviour of nanocrystalline electrodeposits has recently been studies by potentiodynamic and potentiostatic testing in a 2N $H_2SO_4$ solution. As shown in FIG. 9, nanocrystalline nickel exhibits the same active-passive-transpassive behaviour as observed in normal crystalline nickel. However, the current density in the passive range for nanocrystalline materials is higher than for conventional nickel. This is believed to be due to the increased defect concentration in the passive layer on nanocrystalline material. On the other hand, nanoprocessed Ni did not show the detrimental type of localized corrosion along the grain boundaries which is usually observed for conventional nickel. Therefore, although the general corrosion rate is somewhat enhanced, the overall excellent corrosion performance of nickel is likely not sacrificed by nanoprocessing.

We claim:

1. A process for electrodepositing a selected metallic material in nanocrystalline form on a substrate comprising:
   (a) providing an electrolytic cell having an anode and cathode;
   (b) introducing an aqueous, electrolyte containing ions of said selected metallic material into said electrolytic cell;
   (c) maintaining said electrolyte at a temperature in the range between about 15° C. and about 75° C.; and
   (d) passing a D.C. current, having a peak current density in the range between about 0.1 and about 3.0 A /$cm^2$, at pulsed intervals during which said current passes for a time period in the range of about 0.1 to about 50 milliseconds and does not pass for a time period in the range of about 1 to about 500 milliseconds, between said anode and said cathode to deposit said selected metallic material in nanocrystalline form on said cathode.

2. A process as claimed in claim 1 wherein said selected metallic material is selected from the group consisting of (a) a pure metal selected from the group consisting of Co, Cr, Cu, Fe, and (b) alloys containing at least two elements selected from Ni, Fe, Co, Zn, W, Cr, Cu, Mo, Mn, V, Si, P, C, and S, and having a grain size of less than 100 nm, where in a binary alloy when a first said element is nickel, the second element is not iron or phosphorus and in a binary alloy in which the first element is Co, the second element is not W.

3. A process as claimed in claim 1 including the step of periodic pulse reversal.

4. A process as claimed in claim 3 wherein said current passes for 2.5 m sec and does not pass for 45 m sec.

5. A process as claimed in claim 1 wherein said electrolyte includes up to 10 g/l of a stress reliever and grain refining agent selected from the group consisting of saccharin, sodium citrate, ethylene diamine tetra acetate, citric acid, sodium fluoride, coumarin, sodium lauryl sulfate and thiourea.

6. A nanocrystalline metallic material having a grain size of less than 100 nm selected from the group consisting of (a) a pure metal selected from the gorup consisting of Co, Cr, Cu and Fe, and (b) alloys containing at least two elements selected from the group consisting of Ni, Fe, Co, Zn, Mg, Cr, Cu, Mn, V, Si, P, C, and S, where, in a binary alloy in which a first said element is Ni the second element is not Fe or P.

7. A nanocrystalline ternary or quaternary nickel-iron alloy having a formula Ni Fe $X_1$ $X_2$ where $X_1$ and $X_2$ are the same or different and selected from the group consisting of Cr, Co, Cu, Mn, V, Mg, Si, P, C, and S.

8. A nanocrystalline alloy as claimed in claim 7 wherein $X_1$ and $X_2$ are selected from Cr and Mn.

9. A nanocrystalline alloy as claimed in claim 7 wherein $X_1$ and $X_2$ are selected from Cu and Cr.

* * * * *

UNITED STATES PATENT AND TRADEMARK OFFICE
CERTIFICATE OF CORRECTION

PATENT NO. : 5,433,797
DATED : July 18, 1995
INVENTOR(S) : U. Erb. et al.

It is certified that error appears in the above-indentified patent and that said Letters Patent is hereby corrected as shown below:

At col 8 line 43 amend "gorup" to read "group".

Figure 8:
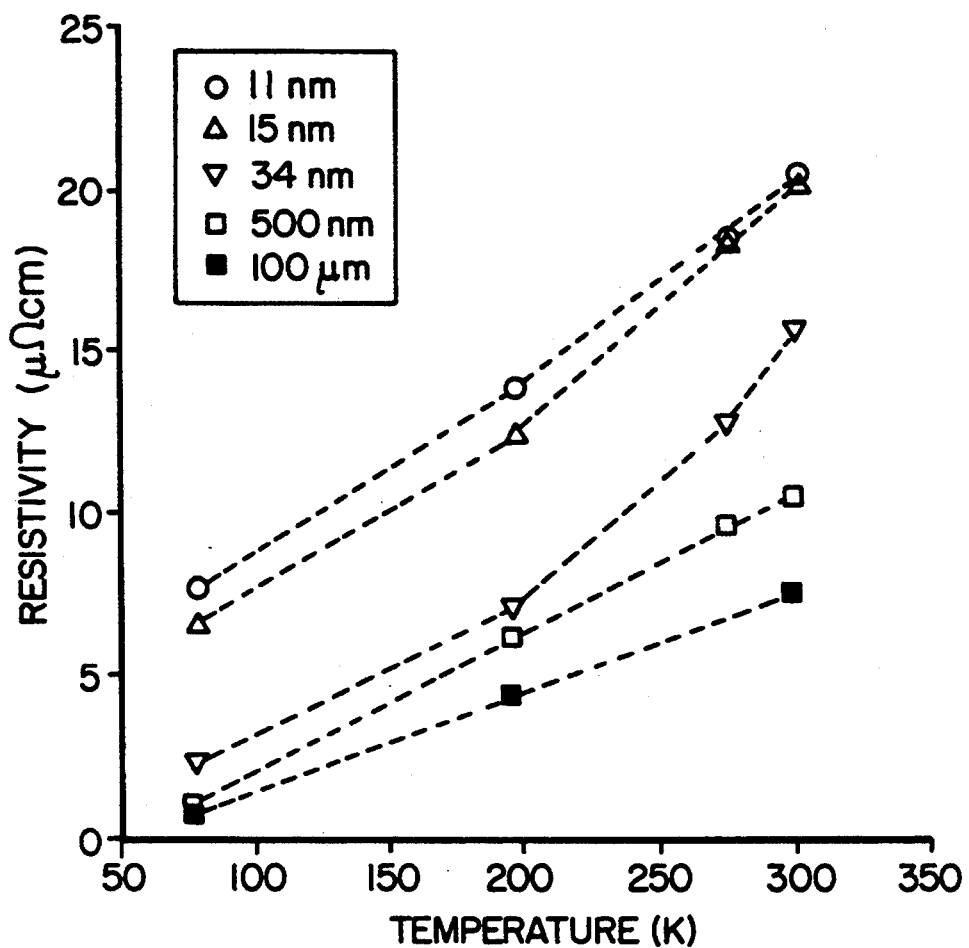
FIG. 8 is a graph illustrating excess resistivity as a function of intercrystalline volume fraction.

In sheet 5 of the drawings amend figure heading "Fig. 7" to read "Fig. 8"

and in sheet 6 of the drawings amend figure heading "Fig. 8" to read "Fig. 7"

Signed and Sealed this

Twenty-first Day of November, 1995

Attest:

BRUCE LEHMAN

Attesting Officer

Commissioner of Patents and Trademarks